(12) United States Patent
Gambino et al.

(10) Patent No.: US 6,412,400 B1
(45) Date of Patent: Jul. 2, 2002

(54) BAKING ASSEMBLY FOR PREPARING A FILLED WAFFLE

(75) Inventors: Charles Gambino, Kalamazoo; Mark King; Michael J. Bauman, both of Battle Creek, all of MI (US)

(73) Assignee: Kellogg Company, Battle Creek, MI (US)

( * ) Notice: Subject to any disclaimer, the term of this patent is extended or adjusted under 35 U.S.C. 154(b) by 0 days.

(21) Appl. No.: 09/953,810

(22) Filed: Sep. 17, 2001

Related U.S. Application Data
(60) Provisional application No. 60/232,824, filed on Sep. 15, 2000.

(51) Int. Cl.[7] .......................... A47J 37/00; A47J 37/06; A23L 1/00; A21B 1/00
(52) U.S. Cl. .......................... 99/375; 99/372; 99/376; 99/377; 99/380; 99/381; 99/383
(58) Field of Search .......................... 99/331–333, 337, 99/338, 339, 340, 341, 344, 372–384, 385, 389, 391, 450.1, 400, 450.6, 401, 450.7, 444–450; 219/521, 524, 525, 536, 537; 426/523, 138, 501, 514, 441, 442

(56) References Cited

U.S. PATENT DOCUMENTS

| | | | | | |
|---|---|---|---|---|---|
| 1,609,317 A | * | 12/1926 | Smith | .......................... | 99/377 |
| 1,708,499 A | * | 4/1929 | Filbey | .......................... | 99/377 |
| 1,879,010 A | * | 9/1932 | Antrim | .......................... | 99/377 |
| 1,954,235 A | * | 4/1934 | Becker | .......................... | 99/378 X |
| 2,116,688 A | * | 5/1938 | Ratliff | .......................... | 99/377 |
| 2,478,529 A | * | 8/1949 | Farr et al. | .......................... | 219/524 X |
| 2,765,727 A | * | 10/1956 | Lipsich et al. | .......................... | 219/525 X |
| 3,236,998 A | * | 2/1966 | Wertheimer et al. | .......................... | 219/524 X |
| 3,245,337 A | * | 4/1966 | White et al. | .......................... | 99/331 X |
| 3,377,942 A | * | 4/1968 | Carbon | .......................... | 99/376 |
| 3,848,110 A | * | 11/1974 | Giguere et al. | .......................... | 219/525 X |
| 3,852,569 A | * | 12/1974 | Potvin | .......................... | 99/425 X |
| 4,027,139 A | * | 5/1977 | Theimer | .......................... | 219/525 X |

\* cited by examiner

*Primary Examiner*—Timothy F. Simone
(74) *Attorney, Agent, or Firm*—Howard & Howard

(57) ABSTRACT

A baking assembly for preparing a baked filled waffle is disclosed. The baking assembly comprises an upper plate and a lower plate each of the plates having a baking surface with a plurality of outer pyramids and a plurality of inner pyramids. Each of the outer pyramids have a height that is greater than the height of the inner pyramids. The upper plate is receivable on the lower plate and when so received the outer pyramids of the upper plate align with the outer pyramids of the inner plate to form a plurality of pinch points. The inner pyramids of the upper plate align with the inner pyramids of the lower plate when the upper plate is received on the lower plate and thereby form a pocket region defined between the inner pyramids of the upper plate and the inner pyramids of the lower plate.

11 Claims, 6 Drawing Sheets

BAKING ASSEMBLY FOR PREPARING A FILLED WAFFLE

RELATED APPLICATIONS

This application claims the benefit of U.S. Provisional Application No. 60/232,824, filed Sep. 15, 2000.

BACKGROUND OF THE INVENTION

The subject invention relates to a baking assembly for preparing a food product having a filling and, more particularly, a waffle baking assembly for preparing a filled waffle.

Frozen toaster products, such as a toaster waffles, have become widely consumed as part of a meal due to their convenience and short preparation time. The typical toaster waffle is pre-cooked, packaged, and frozen for storage. A consumer typically toasts the waffle while it is still frozen to produce a toasted waffle having a crisp outer surface and that is heated throughout. It is desirable to enhance the flavor of the toaster waffle by adding a filling material such as fruit, jelly, cheese, and the like. Manufacturing such a product can present several production problems, especially when it is scaled up to a mass production system.

A typical frozen waffle is produced by depositing waffle batter onto a lower waffle baking surface, closing an upper waffle baking surface over the lower waffle baking surface, thereby forming a waffle-shaped space, and cooking the batter to form a baked waffle. The baked waffle is subsequently frozen and packaged for storage and delivery to consumers. In a typical procedure the volume of batter deposited onto the lower waffle baking surface is less than the volume of the baked waffle. The deposited volume can be as low as one third the volume of the baked waffle. The batter is deposited onto the center of the lower waffle baking surface and it must flow to completely fill the waffle-shaped space as it is being baked. This flow is the result of fluid flow, leavening action and flow caused by the escape of water from the batter in the form of steam. Because the uncooked batter tends to have a very low viscosity of about 100 centipoise, it initially flows very rapidly. While the batter cooks its viscosity increases as the batter gelatinizes, until it finally becomes a solid baked product. A typical waffle baking assembly cannot produce a filled waffle.

The difficulties of preparing a filled waffle are magnified and more numerous when trying to prepare them in a modem manufacturing facility as opposed to making them one at a time. In a typical manufacturing facility unfilled waffles are produced on assembly and conveyor lines that can create dozens of waffles at a time. It is necessary that all parts of the line continue to move in a coordinated fashion to produce a successful consumer product. Any slow down or problem in one portion of the line can cause the whole line to shut down leading to delay and added expense.

Using a typical waffle baking assembly when attempting to prepare a filled waffle in a manufacturing facility causes the filling to be squeezed out of the waffle batter onto the cooking surface when the assembly is closed for baking. Several production related problems arise when the filling is squeezed out of the waffle batter. The filling material becomes caramelized on the baking surface and causes subsequently baked waffles to stick to the surface preventing the release of the waffle from the assembly. This can require the line be shut down to clean the surface, leading to waste and inefficiency. If the filling material builds up on the baking surface it will become carbonized to a blackened residue, which will discolor subsequent waffle casings, leading to an unacceptable product to consumers and further waste. Further, filing material that is squeezed out of the waffle batter can remain on the outer surface of the waffle casing after the waffle is removed from the assembly. The filling material disposed outside the waffle casing can build up on conveyors and packaging equipment used in subsequent production operations, which requires frequent cleaning shutdowns. All of these delays can significantly reduce the production capacity of a manufacturing facility.

Therefore, it would be desirable to design a waffle baking assembly that permits preparation of a filled waffle that can subsequently be toasted by a consumer.

SUMMARY OF THE INVENTION

In one embodiment, the present invention is a baking assembly for baking a filled waffle comprising: an upper plate and a lower plate, each of the plates having a baking surface with a plurality of outer pyramids and a plurality of inner pyramids with each of the outer pyramids having a height that is greater than a height of each of the inner pyramids; the outer pyramids of the upper plate aligning with the outer pyramids of the lower plate when the upper plate is received on the lower plate, the aligned outer pyramids forming a plurality of pinch points; and the inner pyramids of the upper plate aligning with the inner pyramids of the lower plate, with a pocket region defined between the inner pyramids of the upper plate and the inner pyramids of the lower plate when the upper plate is received on the lower plate.

In an other embodiment, the present invention is a baking assembly for baking a filled waffle comprising: an upper plate having a baking surface and a lower plate having a baking surface, the upper plate receivable on the lower plate and a waffle space defined between the baking surface of the upper plate and the baking surface of the lower plate when the upper plate is received on the lower plate; the baking surface of the upper plate having an outer wall surrounding a cavity, at least a first raised portion adjacent the cavity and located between the cavity and at least a second raised portion, the second raised portion having a height that is less than a height of the first raised portion; the baking surface of the lower plate having an outer wall surrounding a cavity, at least a first raised portion adjacent the cavity and located between the cavity and at least a second raised portion, the second raised portion having a height that is less than a height of the first raised portion; the first raised portion of the upper plate aligned with the first raised portion of the lower plate when the upper plate is received on the lower plate and thereby forming a pinch point region in the waffle space; and the second raised portion of the upper plate aligned with the second raised portion of the lower plate when the upper plate is received on the lower plate and thereby forming a pocket region in the waffle space.

The baking assembly of the present invention forms features including a dynamic pinch point and a pocket region in a waffle that prevent the filling material from leaking out of the waffle during the baking process. The dynamic pinch point prevents the filling material from leaving the pocket region and the pocket region provides space for the filling material while the assembly is closed for baking the waffle, so the filling material will not be squeezed out of the waffle into the assembly. The dynamic pinch point formed in the waffle seals the filling material inside the waffle thereby preventing it from leaking out during the baking process.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
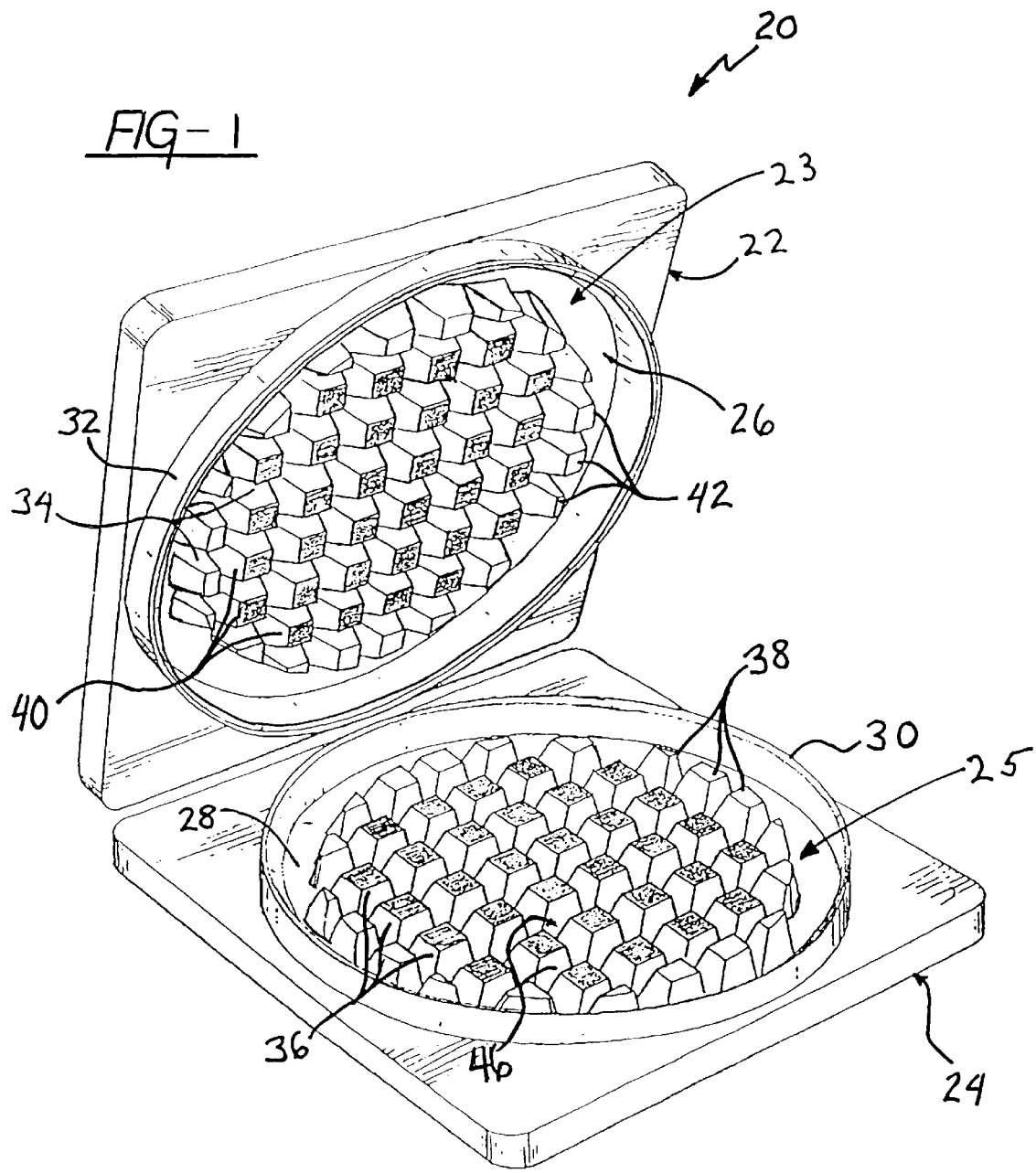
FIG. 1 is a perspective view of a baking assembly designed according to the present invention.

Referring to FIG. 1, one embodiment of a waffle baking assembly is shown generally at 20 in an open position. The assembly 20 includes an upper plate 22 and a lower plate 24. The upper plate 22 is receivable on the lower plate 24 when the baking assembly 20 is in a closed position.

Figure 4:
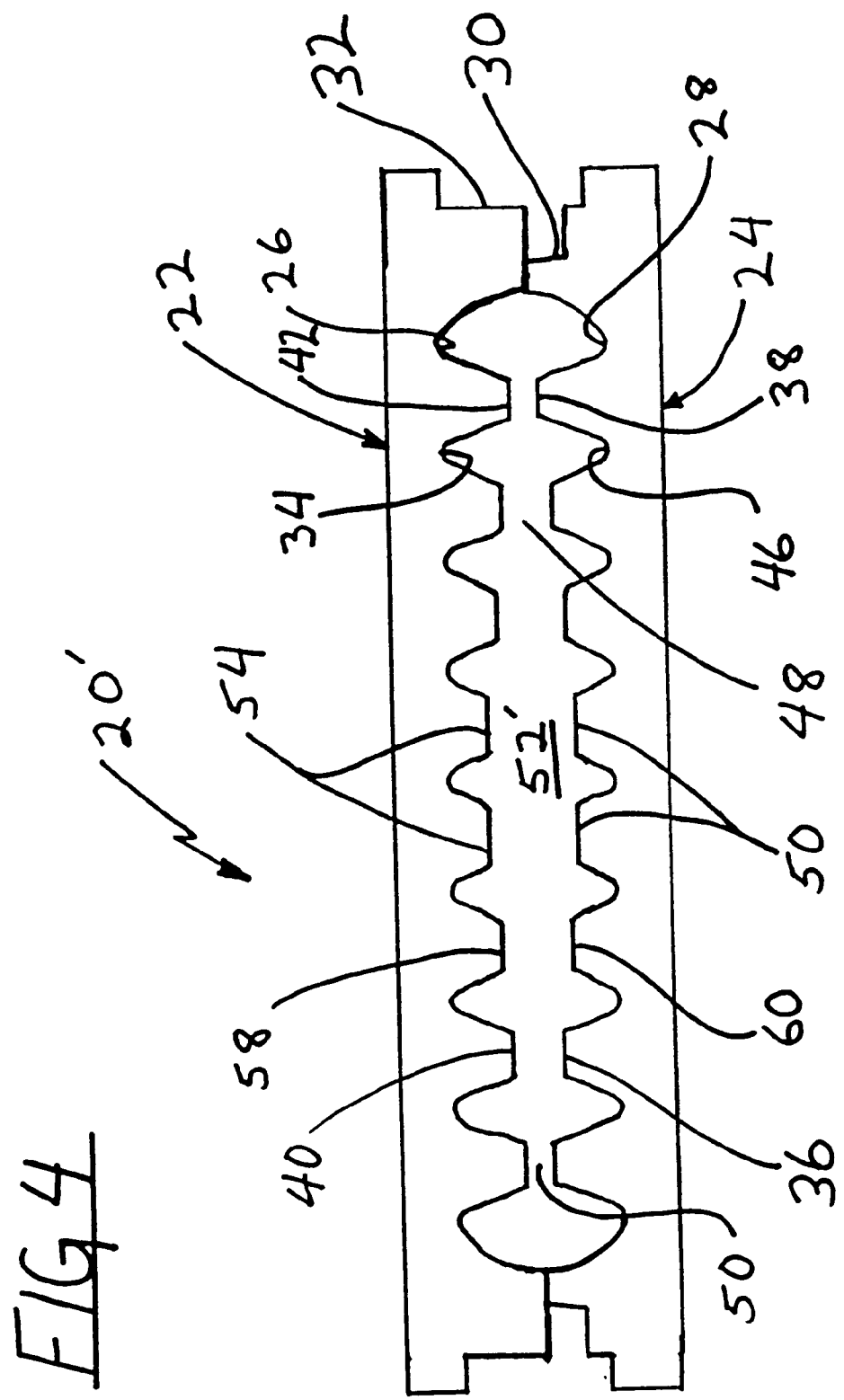
FIG. 4 is a cross-sectional view of an alternative embodiment of the baking assembly of FIG. 1 in the closed position.

The upper plate 22 includes an upper cavity 26 encircled by an upper wall 32. The upper plate 22 includes a plurality of inner pyramids 40 that are encircled by a plurality of outer pyramids 42. The outer pyramids 42 have a height that is greater than a height of the inner pyramids 40. The inner pyramids 40 are preferably milled down from about 1/32 of an inch to about 1/8 of an inch relative to the outer pyramids 42. Preferably, the ratio of the height of the inner pyramids 40 to the height of the outer pyramids 42 ranges from about 0.6:1.0 to 0.9:1.0. The more centrally located inner pyramids 40 can be milled to a lower height than the peripherally located inner pyramids 40 to form a concave surface defined by the tops of the inner pyramids 40, as shown in FIG. 4. The outer pyramids 42 are encircled by the upper cavity 26. The upper wall 32, upper cavity 26 and pyramids 40, 42 form a baking surface 23 of the upper plate 22. Preferably the baking surface 23 is coated with a non-stick coating such as Teflon® or an equivalent non-stick coating material. The pyramids 40, 42 are separated from each other by a space 34.

The lower plate 24 has a virtually identical design to the upper plate 22. The lower plate 24 includes a lower cavity 28 encircled by a lower wall 30. The lower plate 24 includes a plurality of inner pyramids 36 that are encircled by a plurality of outer pyramids 38. The outer pyramids 38 have a height that is greater than a height of the inner pyramids 36. The inner pyramids 36 are preferably milled down from about 1/32 of an inch to about 1/8 of an inch relative to the outer pyramids 38. Preferably, the ratio of the height of the inner pyramids 36 to the height of the outer pyramids 38 ranges from about 0.6:1.0 to 0.9:1.0. The more centrally located inner pyramids 36 can be milled to a lower height than the peripherally located inner pyramids 36 to form a concave surface defined by the tops of the inner pyramids 36, as shown in FIG. 4. The outer pyramids 38 are encircled by the lower cavity 28. The lower wall 30, lower cavity 28 and pyramids 36, 38 form a baking surface 25 of the lower plate 22. Preferably the baking surface 25 is coated with a non-stick coating such as Teflon® or an equivalent non-stick coating material. The pyramids 36, 38 are separated from each other by a space 46.

The spaces 34, 46 are sufficiently large to allow batter to flow between the pyramids 36, 38, 40, 42 when it is deposited into the lower plate 24 and when the assembly 20 is closed to bake the batter as described below.

The assembly 20 can be formed out of any heat conductive material including aluminum and stainless steel. The assembly 20 is heated by any heating means including electrical generated heat and flame generated heat.

Figure 2:
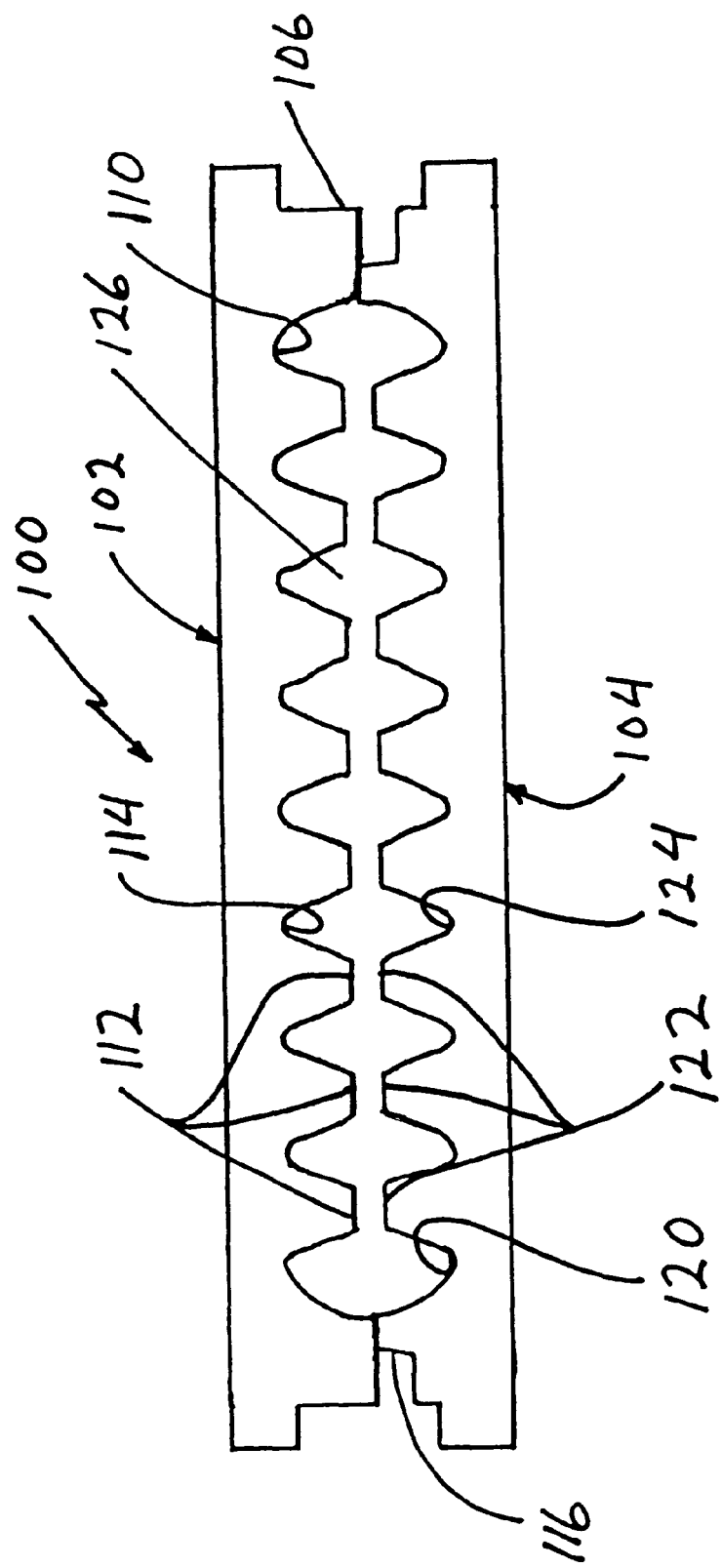
FIG. 2 is a cross-sectional view of a Prior Art typical waffle baking assembly in a closed position.

In FIG. 2 a cross-sectional view of a typical Prior Art waffle baking assembly is generally shown at 100 in a closed position. The baking assembly 100 includes an upper plate 102 receivable on a lower plate 104 when the assembly is in the closed position. The upper plate 102 includes an upper wall 106 surrounding an upper cavity 110. The upper plate 102 further includes a plurality of pyramids 112 encircled by the upper cavity 110, with a space 114 between adjacent pyramids 112. The lower plate 104 includes a lower wall 116 surrounding a lower cavity 120. The lower plate 104 further includes a plurality of pyramids 122 encircled by the lower cavity 120, with a space 124 between adjacent pyramids 122. When in the closed position the assembly 100 defines a waffle space 126 between the upper plate 102 and the lower plate 104. Unlike the present invention, in the typical baking assembly 100 all of the pyramids 112, 122 have the same height.

In use of the assembly 100 batter is deposited onto the center of the lower plate 104 and the upper plate 102 is then placed over the lower plate 104. The batter flows across the lower plate 104, into the spaces 124 and lower cavity 120. Likewise the batter flows across the upper plate 102, into the spaces 114 and the upper cavity 110. As the batter cooks the leavening action and escape of water in the form of steam from the batter causes the batter to fill the waffle space 126. Once the batter is cooked the waffle is formed and can be released from the assembly 100.

Early attempts by the inventors demonstrated that if one placed a filling material onto the batter after it was deposited onto the lower plate 104 one could not produce a satisfactory filled waffle. The filling material was pushed out of the batter before it cooked and onto the pyramids 112, 122 causing the production difficulties noted above. As an initial step the inventors uniformly milled down the pyramids 112 and 122 in an attempt to provide additional room for a filling material. When these modified assemblies were used the results were also unsatisfactory. The filling material was pushed out of the batter and onto the baking surfaces predominantly in the region of the upper and lower cavities, 110 and 120, respectively. Additionally, over 75% of the waffles stuck to either the upper plate 102 or the lower plate 104 and could not be released. Obviously, neither of these assemblies could be used to produce a filled waffle.

Figure 3:
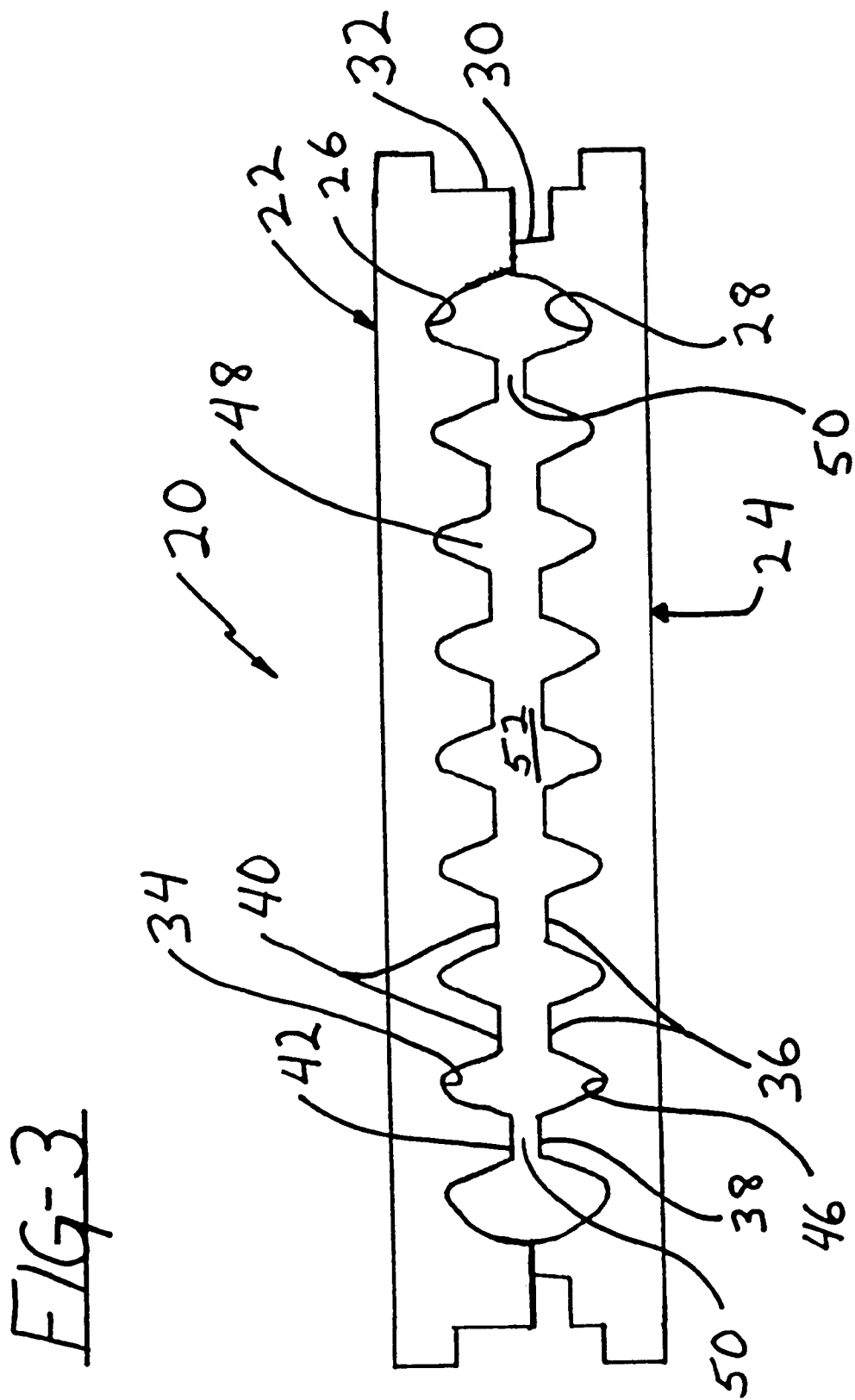
FIG. 3 is a cross-sectional view of the baking assembly of FIG. 1 in a closed position.

In FIG. 3 the baking assembly 20 of FIG. 1 is shown in a closed position wherein the upper plate 22 is received on the lower plate 24. When the upper plate 22 is received on the lower plate 24 the outer pyramids 42 of the upper plate 22 are aligned with the outer pyramids 38 of the lower plate 24. Likewise, the inner pyramids 40 of the upper plate 22 are aligned with the inner pyramids 36 of the lower plate 24. When the upper plate 22 is received on the lower plate 24 a waffle space 48 is defined between their respective baking surfaces 23, 25. As can be seen in the cross-sectional view of FIG. 3, the waffle space 48 has a number of features including a plurality of pinch points 50 formed by the aligning outer pyramids 42, 38 of the upper plate 22 and the lower plate 24. The pinch points 50 have a thickness that is thinner than that of a pocket region 52 formed in the waffle space 48 by the alignment of the inner pyramids 40 of the upper plate 22 and the inner pyramids 36 of the lower plate 24.

It is the combination of the pinch points 50 and the pocket region 52 created by the baking assembly 20 that enables one to prepare a filled waffle. While not wishing to be bound by any particular theory, it is believed that the dynamic pinch points 50 create a region where the batter, used to prepare the filled waffle, arrives first and sets up to form a dam or stop thereby preventing the filling material from leaving the pocket region 52. Utilizing the baking assembly 20 shown in FIG. 3 one is able to readily create a filled waffle wherein the filling material is not pushed out of the batter onto the pyramids 36, 38, 40, 42 or into the cavities 26, 28. In addition, a filled waffle produced using the baking assembly 20 is readily released from the baking assembly 20 once it has been baked as discussed more fully below.

In FIG. 4, a cross-sectional view of a modification of the baking assembly 20 is generally shown at 20'. Common features to baking assembly 20 are given the same reference numerals. Baking assembly 20' is very similar to baking assembly 20 with the following exceptions. In baking assembly 20' the upper plate 22 includes a plurality of centrally located inner pyramids 54 have a height that is lower than that of a plurality of more peripherally located inner pyramids 58. Likewise, the lower plate 24 includes a plurality of centrally located inner pyramids 50 that have a height which is lower than that of a plurality of more peripherally located inner pyramids 60. In the baking assembly 20' the pocket region 52' has a concave shape as defined by the surfaces of the inner pyramids 54–60.

Figure 5:
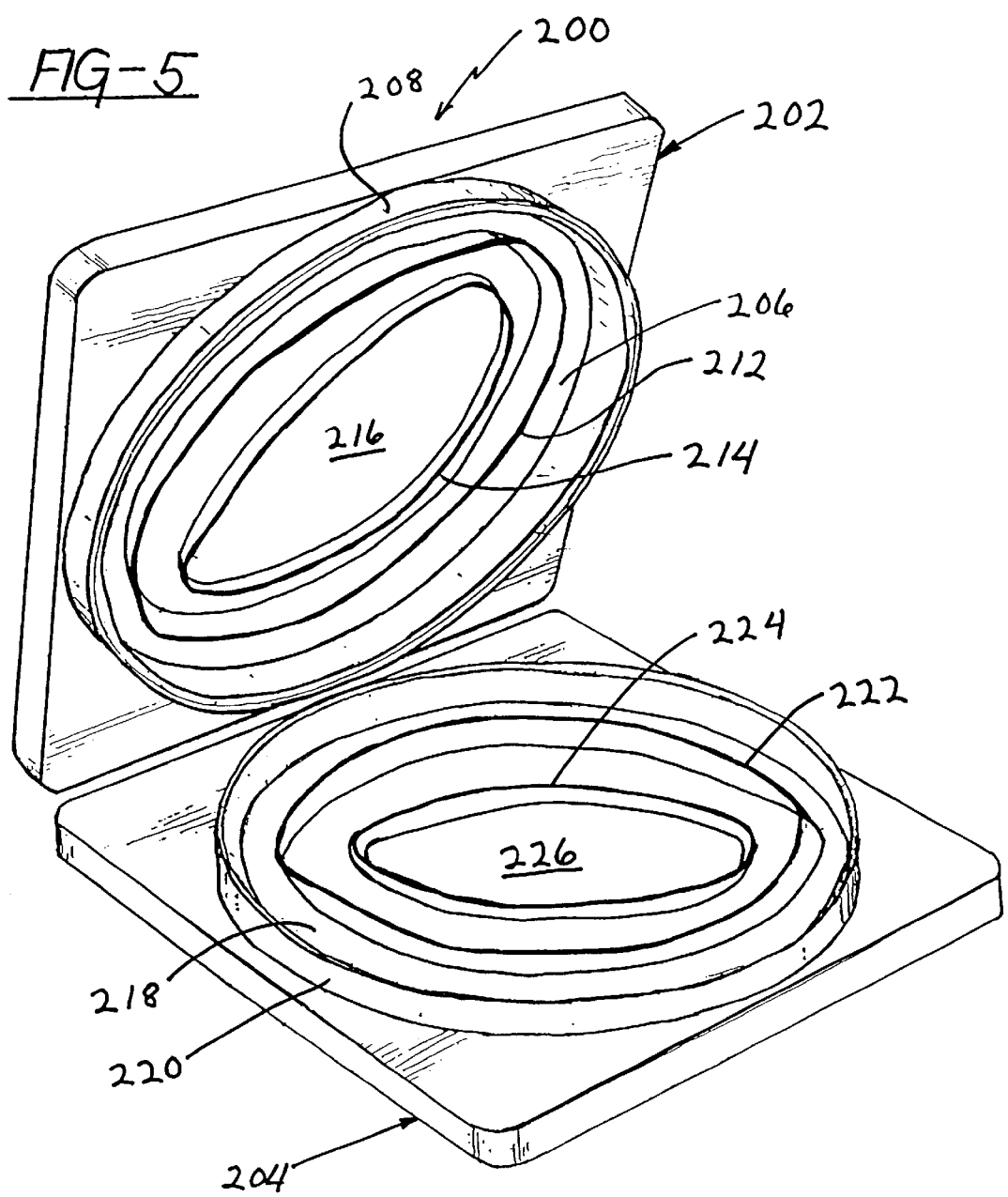
FIG. 5 is a perspective view of an alternative embodiment of a baking assembly designed according to the present invention in the open position.

In FIG. 5 an alternative embodiment of a baking assembly designed according to the present invention is shown generally at 200 in an open position. Baking assembly 200 comprises an upper plate 202 receivable on a lower plate 204 when the baking assembly 200 is in a closed position.

The upper plate 202 includes an upper cavity 206 encircled by an upper wall 208. The upper plate 202 includes a first raised portion 212 adjacent the cavity 206. Interior to the first raised portion 212 is at least one second raised portion 214. The first raised portion 212 has a height that is greater than a height of the at least one second raised portion 214. Preferably, the first raised portion is from 1/32 of an inch to about 1/8 of an inch higher than the second raised portion 214. Most preferably, the ratio of the height of the first raised portion 212 to the height of the second raised portion 214 ranges from about 0.6:1.0 to 0.9:1.0. The upper wall 208, upper cavity 206, first raised portion 212, and second raised portion 214 form a baking surface 216 of the upper plate 202. Preferably, the baking surface 216 is coated with a non-stick coating such as Teflons or an equivalent non-stick coating material.

The lower plate 204 has a virtually identical design to the upper plate 202. Lower plate 204 includes a lower cavity 218 encircled by a lower wall 220. The lower plate 204 further includes a first raised portion 222 adjacent the cavity 218. Interior to first raised portion 222 lower plate 204 includes at least one second raised portion 224. Second raised portion 224 has a height that is lower than a height of the first raised portion 222 by an amount of from 1/32 of an inch to 1/8 of an inch. Preferably, the ratio of the height of the second raised portion 224 to the height of the first raised portion 222 ranges from about 0.6:1.0 to 0.9:1.0. The outer wall 220, cavity 218, first raised portion 222, and second raised portion 224 of the lower plate 204 define a baking surface 226 of the lower plate 204. Preferably, the baking surface 226 is coated with a non-stick coating such as Teflon® or an equivalent non-stick coating material. When baking assembly 200 is in the closed position the first raised portions 212, 222 are aligned with each other and the second raised portions 214, 224 are aligned with each other. The baking surfaces 216, 226 define a waffle space between them when the baking assembly 200 is in the closed position. The first raised portions 212, 222 define a pinch point region between them when assembly 200 is in the closed position, as described above for assembly 20. Also, the portion of the baking surfaces 216, 226 interior to the first raised portions 212, 222 define a pocket region when the baking assembly 200 is closed.

For the sake of presenting a more simplified design to explain the principals of the present invention baking assembly 200 has been shown to include only a first raised portion 212, 222 and a second raised portion 214, 224 on the upper plate 202 and the lower plate 204, respectively. Also, these portions have been shown as simple circular walls. As would be understood by one of ordinary skill in the art, however, baking assembly 220 could comprise a much more complex arrangement of first raised portions 212, 222 and second raised portions 214, 224. For example, baking assembly 200 could be designed such that interior to the first raised portions 212, 222 one included a series of second raised portions 214, 224 that presented a design or the outline of a character such as a cartoon character. Likewise, the contour of walls 208, 220 could be designed in the outline of a figure. The principals that would be common to all such modifications are that the baking assembly 200, when assembled in the closed position, includes a first raised portion 212, 222 that is higher than all of the second raised portions 214, 224 such that a waffle space defined between the upper plate 202 and the lower plate 204 when the upper plate 202 is assembled on the lower plate 204, includes either one or more pinch points encircling a pocket region as explained above. As will be understood by one of ordinary skill in the art, baking assemblies 20, 20', and 200 produce a filled waffle having an outer shape that reflects the contour of the walls 30, 32, 208, and 220. One of ordinary skill in the art would realize that the shape of these walls could be changed to produce any shape of a filled waffle including a round shape, a square shape, a rectangular shape, a polygonal shape, or any other outer shape of the filled waffle.

Figure 6:
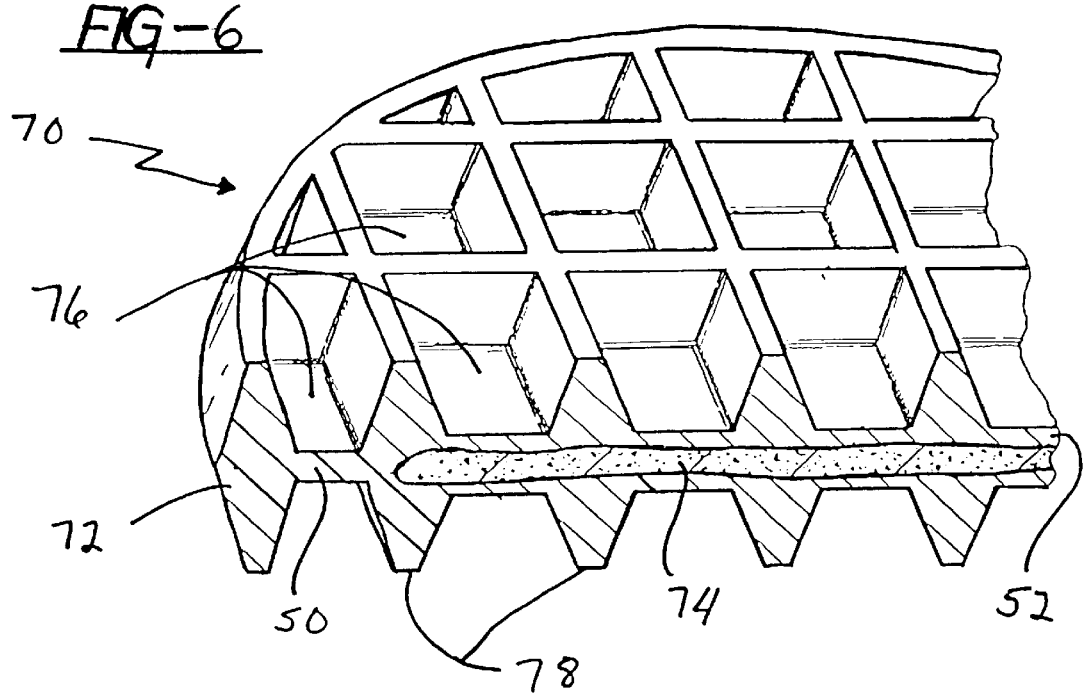
FIG. 6 is a partial cross-sectional view of a round waffle produced by the baking assembly of FIG. 1.

In FIG. 6, a partial cross-sectional view of a filled waffle produced using baking assembly 20 is shown generally at 70. Filled waffle 70 comprises an outer casing 72 and an inner filling material 74. As is common for the design of unfilled waffles, filled waffle 70 includes a plurality of webs 76 each of which is surrounded by a plurality of ridges 78. The webs 76 are formed by the pyramids 36, 38, 40, 42 of the plates 22, 24.

Ridges 78 are formed by the spaces 34, 36 between the pyramids 36, 38, 40, 42. It can be seen from the figure that the webs 76 formed by the inner pyramids 36, 40 are thicker than the webs 76 formed by the outer pyramids 38, 42. Also shown in the figure is the shape of the pocket region 52 and the pinch points 50 of the baking assembly 20. The pinch points 50 of baking assembly 20 result in a filled waffle 70 wherein the filling material 74 does not leak out of the filled waffle 70.

Figure 7:
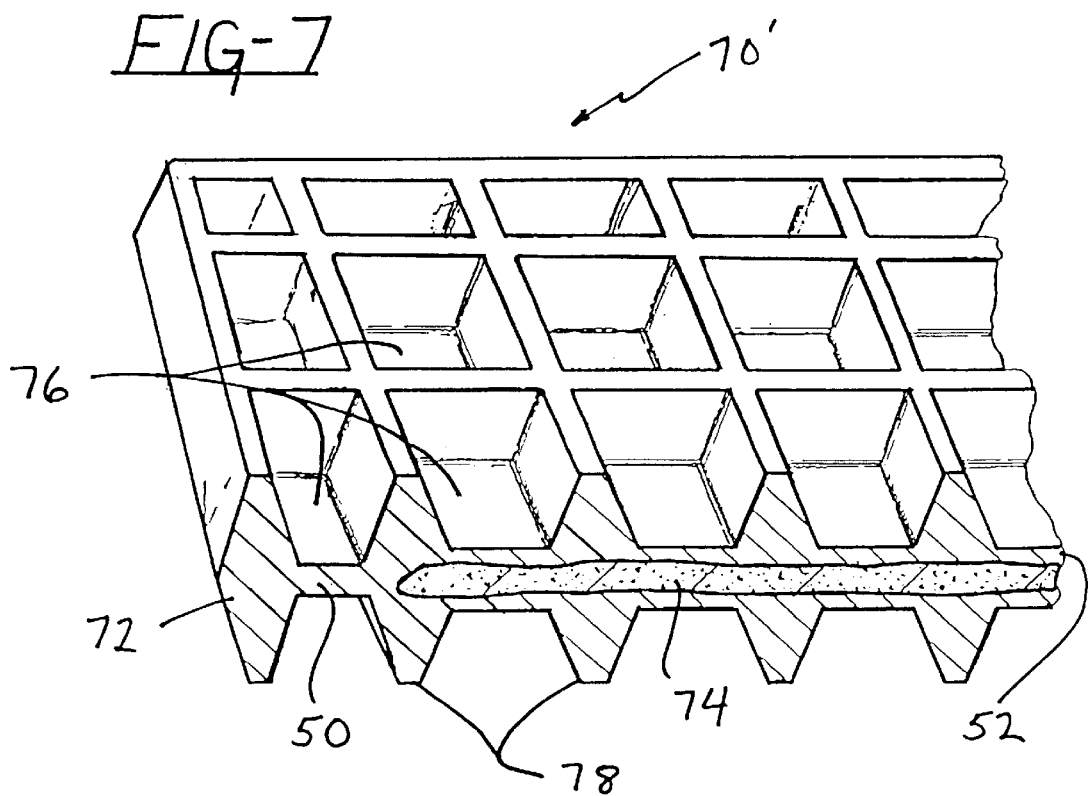
FIG. 7 is a partial cross-section view of a square waffle produced according to the present invention.

FIG. 7 is a cross-sectional view of a alternative embodiment of a filled waffle 70' similar to that shown in FIG. 6 wherein the only change is the outer shape of the filled waffle 70'. All of the common features shown in FIG. 7 utilize the same numbers as FIG. 6.

The filling material 74 may comprise any sort of filling material including fruits, cheeses, or vegetables. Batter used to form the outer casing material 72 may comprise any sort of a waffle type batter, formulations of which are well known in the art. After the filled waffle 70 has been baked, it is frozen for storage and shipping. The frozen filled waffle 70 can be reheated for consumption in a standard vertical toaster.

Prior to use of any of the assemblies 20, 20', 200 of the present invention they are preheated and maintained at a temperature between approximately 120° C. and 205° C. In making the filled waffle 70 a first layer of batter is poured onto the lower plate 24 followed by deposit of a ribbon of filling material 74 onto the batter. Then a second layer of batter is poured over the filling material 74 and the baking assembly 20, 20', 200 is moved into the closed position. The filled waffle 70 is allowed to bake for a period between approximately 50 and 240 seconds, depending on the temperature of the baking assembly 20, 20', 200. As the batter cooks it fills the waffle space 48 and forms filled waffle 70. The baking assembly 20, 20', 200 is then opened and the filled waffle 70 removed. The filled waffle 70 is then cooled, frozen, and packaged for distribution to retailers.

What is claimed is:

1. A baking assembly for baking a filled waffle comprising:
    an upper plate and a lower plate, each of said plates having a baking surface with a plurality of outer pyramids and a plurality of inner pyramids with each of said outer pyramids having a height that is greater than a height of each of said inner pyramids;
    said outer pyramids of said upper plate aligning with said outer pyramids of said lower plate when said upper plate is received on said lower plate, said aligned outer pyramids forming a plurality of pinch points; and
    said inner pyramids of said upper plate aligning with said inner pyramids of said lower plate, with a pocket region defined between said inner pyramids of said upper plate and said inner pyramids of said lower plate when said upper plate is received on said lower plate.

2. A baking assembly as recited in claim 1, wherein said height of said inner pyramids of said upper and said lower plate is from about 1/32 to about 1/8 of an inch shorter than said height of said outer pyramids of said upper and said lower plate.

3. A baking assembly as recited in claim 1, wherein the ratio of said height of said inner pyramids to said height of said outer pyramids is from about 0.6:1.0 to about 0.9:1.0.

4. A baking assembly as recited in claim 1, wherein said baking surface of each of said upper and said lower plates further includes a non-stick coating.

5. A baking assembly as recited in claim 1, wherein said upper plate and said lower plate each include a cavity surrounding said inner and said outer pyramids.

6. A baking assembly as recited in claim 5, wherein said upper plate and said lower plate each include a wall surrounding said cavity, said outer pyramids and said inner pyramids.

7. A baking assembly for baking a filled waffle comprising:
    an upper plate having a baking surface and a lower plate having a baking surface, said upper plate receivable on said lower plate and a waffle space defined between said baking surface of said upper plate and said baking surface of said lower plate when said upper plate is received on said lower plate;
    said baking surface of said upper plate having an outer wall surrounding a cavity, at least a first raised portion adjacent said cavity and located between said cavity and at least one second raised portion, said second raised portion having a height that is less than a height of said first raised portion;
    said baking surface of said lower plate having an outer wall surrounding a cavity, at least a first raised portion adjacent said cavity and located between said cavity and at least one second raised portion, said second raised portion having a height that is less than a height of said first raised portion;
    said first raised portion of said upper plate aligned with said first raised portion of said lower plate when said upper plate is received on said lower plate and thereby forming a pinch point in said waffle space; and
    said second raised portion of said upper plate aligned with said second raised portion of said lower plate when said upper plate is received on said lower plate and thereby forming a pocket region in said waffle space.

8. A baking assembly as recited in claim 7, wherein said height of said second raised portion of said upper plate and said lower plate is from about 1/32 to 1/8 of an inch shorter than said height of said first raised portion of said upper plate and said lower plate.

9. A baking assembly as recited in claim 7, wherein the ratio of said height of said second raised portion of said upper plate and said lower plate to said height of said first raised portion of said upper plate and said lower plate is from about 0.6:1.0 to about 0.9:1.0.

10. A baking assembly as recited in claim 7, wherein said baking surface of each of said upper and said lower plates further includes a non-stick coating.

11. A baking assembly as recited in claim 7, wherein said first raised portion of said upper plate and said first raised portion of said lower plate each completely encircle said second raised portion of said upper plate and said second raised portion of said lower plate, respectively.

* * * * *